(12) United States Patent
Xu et al.

(10) Patent No.: US 12,148,894 B2
(45) Date of Patent: Nov. 19, 2024

(54) BATTERY MODULE AND TERMINAL DEVICE

(71) Applicant: BEIJING XIAOMI MOBILE SOFTWARE CO., LTD., Beijing (CN)

(72) Inventors: Liangliang Xu, Beijing (CN); Xuewen Wei, Beijing (CN); Hongbin Zheng, Beijing (CN); Zeng Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 263 days.

(21) Appl. No.: 17/330,555

(22) Filed: May 26, 2021

(65) Prior Publication Data
US 2022/0209306 A1 Jun. 30, 2022

(30) Foreign Application Priority Data

Dec. 28, 2020 (CN) .......................... 202011578193.0

(51) Int. Cl.
*H01M 10/42* (2006.01)
*H01M 50/533* (2021.01)
*H01M 50/59* (2021.01)

(52) U.S. Cl.
CPC ....... *H01M 10/425* (2013.01); *H01M 50/533* (2021.01); *H01M 50/59* (2021.01); *H01M 2220/30* (2013.01)

(58) Field of Classification Search
CPC .......................... H01M 10/425; H01M 50/533
See application file for complete search history.

(56) References Cited

U.S. PATENT DOCUMENTS

| 2013/0252048 | A1* | 9/2013 | Teramoto | H01M 50/507 |
| | | | | 429/161 |
| 2015/0104712 | A1* | 4/2015 | Kerlau | H01M 4/661 |
| | | | | 429/233 |
| 2015/0263389 | A1 | 9/2015 | Moon | |
| 2018/0069211 | A1* | 3/2018 | Mastrandrea | H01M 50/227 |
| 2019/0245185 | A1 | 8/2019 | Ishihara | |
| 2022/0320603 | A1* | 10/2022 | Xie | H01M 10/4207 |

FOREIGN PATENT DOCUMENTS

| CN | 106207285 | A | | 12/2016 | |
| CN | 106450122 | A | * | 2/2017 | ......... H01M 50/502 |
| CN | 206893745 | U | | 1/2018 | |
| CN | 208423037 | U | | 1/2019 | |
| CN | 209822766 | U | | 12/2019 | |

(Continued)

OTHER PUBLICATIONS

Europe Extended European Search Report in Application No. 21176869.2, mailed on Oct. 25, 2021.

(Continued)

*Primary Examiner* — Brian R Ohara
(74) *Attorney, Agent, or Firm* — Syncoda LLC; Feng Ma

(57) ABSTRACT

A battery module includes: a battery cell component, including at least two battery cells arranged in a preset direction; a conductive element, wherein adjacent battery cells are electrically connected through the conductive element; and a protection circuit board, wherein the battery cells located at two ends of the battery cell component are electrically connected to the protection circuit board through corresponding tabs, respectively.

14 Claims, 5 Drawing Sheets

(56) References Cited

FOREIGN PATENT DOCUMENTS

| | | |
|---|---|---|
| CN | 111081964 A | 4/2020 |
| CN | 111403792 A | 7/2020 |
| CN | 112133876 A | 12/2020 |
| EP | 2284930 A1 | 2/2011 |
| EP | 2835846 A1 | 2/2015 |
| JP | 2001256937 A | 9/2001 |

OTHER PUBLICATIONS

CN 2nd Office Action with English in Application No. CN202011578193.0, mailed on Jan. 30, 2024.
CN third office action in application No. 202011578193.0, mailed on May 31, 2024.

* cited by examiner

BATTERY MODULE AND TERMINAL DEVICE

CROSS-REFERENCE TO RELATED APPLICATIONS

This application claims priority to Chinese Patent Application No. 202011578193.0, filed on Dec. 28, 2020, the disclosure of which is hereby incorporated by reference in its entirety.

BACKGROUND

With the development of technology, terminal devices such as mobile phones have increasingly more functions, and users have higher demands on the battery life of the mobile phones. To improve the battery life of mobile phones, battery modules have been gradually evolved from an original single battery cell solution to a composite battery cell solution.

SUMMARY

The present disclosure provides a battery module, a packaging method of the battery module, and a terminal device.

According to a first aspect of the embodiments of the present disclosure, there is provided a battery module, including:
- a battery cell component, including at least two battery cells arranged in a preset direction;
- a conductive element, wherein adjacent battery cells are electrically connected through the conductive element; and
- a protection circuit board, wherein the battery cells located at two ends of the battery cell component are electrically connected to the protection circuit board through corresponding tabs, respectively.

According to a second aspect of the embodiments of the present disclosure, there is provided a packaging method of a battery module, applied to the battery module of any one of the above, wherein the packaging method includes:
- controlling at least two battery cells in a battery cell component to be arranged and positioned in a preset direction;
- controlling adjacent battery cells to be electrically connected through a conductive element;
- controlling the battery cells at two ends of the battery cell component to be electrically connected to the protection circuit board through corresponding tabs, respectively.

According to a third aspect of the embodiments of the present disclosure, there is provided a terminal device, including the battery module according to any one of the above.

It should be noted that the above general description and the following detailed description are merely exemplary and explanatory and should not be construed as limiting of the present disclosure.

BRIEF DESCRIPTION OF THE DRAWINGS

The drawings here are incorporated into the specification and constitute a part of the disclosure, show embodiments in accordance with the present disclosure, and together with the specification are used to explain the principle of the present disclosure.

DETAILED DESCRIPTION

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of apparatuses and methods consistent with some aspects of the present disclosure as detailed in the appended claims.

With the development of technology, terminal devices such as mobile phones have more and more functions, and users have higher and higher requirements on the battery life of the mobile phones. In related technologies, in order to improve the battery life of mobile phones, battery modules have been gradually developed from an original single battery cell solution to a composite battery cell solution.

Whether the composite battery cell solution is a two-cell series solution or a two-cell in parallel, two tabs of each battery cell in the composite battery cell may need to be connected to the same protection circuit board.

Figure 1:
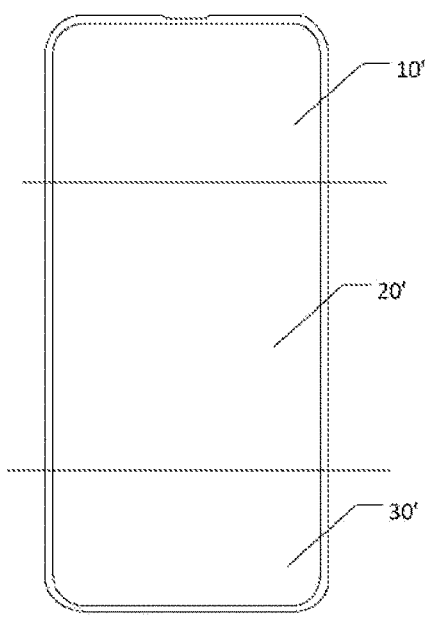
FIG. 1 is a schematic diagram of the layout of a terminal device according to some embodiments.

The layout of the terminal device often adopts a three-stage layout. As shown in FIG. 1, where various embodiments can be implemented, from the top to the bottom of the terminal device, there are a main board area 10', a battery area 20', and a small board area 30' successively. The battery area 20' is used for arranging battery modules. In conjunction with FIG. 1, it can be seen that the space for arranging battery modules in the terminal device may be limited.

If the composite battery cells are effectively installed in the battery area 20', the protection circuit board needs to take into account tabs of all the battery cells, and its size will inevitably increase. In order to arrange a large-size protection circuit board, the battery cells in the composite battery cell solution are mostly arranged side by side along a length direction (Y direction) of the terminal device.

In a typical arrangement of battery cells, the two tabs of each battery cell are connected to the same protection circuit board of the long strip shape. Since when each tab is connected to the protection circuit board, a welding plate is required. Therefore, respective welding plates occupy large space on the protection circuit board, which severely limits the layout and wiring of the protection board, resulting in serious reduction of the space for arranging other electrical components on the protection circuit board.

In order to ensure the effective layout of all required electrical components on the protection circuit board, the protection circuit board has to be further increased in size. In the limited space for arranging the battery module, the larger the size of the protection circuit board is, the smaller the size of the battery cell is, resulting in decreased battery capacity. It is contrary to the design concept of high battery capacity and a reasonable size of a terminal device.

Various embodiments of the present disclosure provide a battery module, including: a battery cell component, including at least two battery cells arranged in a preset direction; a protection circuit board, wherein the battery cells located at two ends of the battery cell component are electrically connected to the protection circuit board through corresponding tabs, respectively; and a conductive element, wherein adjacent battery cells are electrically connected through the conductive element. In the battery module of the present disclosure, the adjacent battery cells are electrically connected through conductive elements; the battery cells located at two ends of the battery cell component are connected with the protection circuit board through the tabs. It is not necessary for tabs of all battery cells to be connected to the protection circuit board, which effectively reduces space of the protection circuit board occupied due to the connection of the tabs, thereby increasing space on the protection circuit board for arranging other electrical components.

In some embodiments, as shown in FIGS. 2 to 7, the battery module of this embodiment includes: a battery cell component 10, a conductive element 20 and a protection circuit board 30. The battery cell component 10 includes at least two battery cells 11 arranged in a preset direction. The adjacent battery cells 11 are electrically connected through the conductive element 20. In the embodiment, the preset direction may be, for example, a length direction (Y direction) or a width direction (X direction) of the terminal device. The arrangement of the battery cells 11 refers to the arrangement of the battery cells 11 side by side, that is, respective battery cells 11 are arranged in sequence and the tabs of the respective battery cells 11 are all on the same side. For example, the tabs of each battery cell 11 are located on the upper side of the battery cell 11, and the protection circuit board 30 can be arranged on the upper side of the battery cell 11 at this time. The protection circuit board 30 may include, for example, a PCB (printed circuit board) and electrical components thereon.

Figure 2:
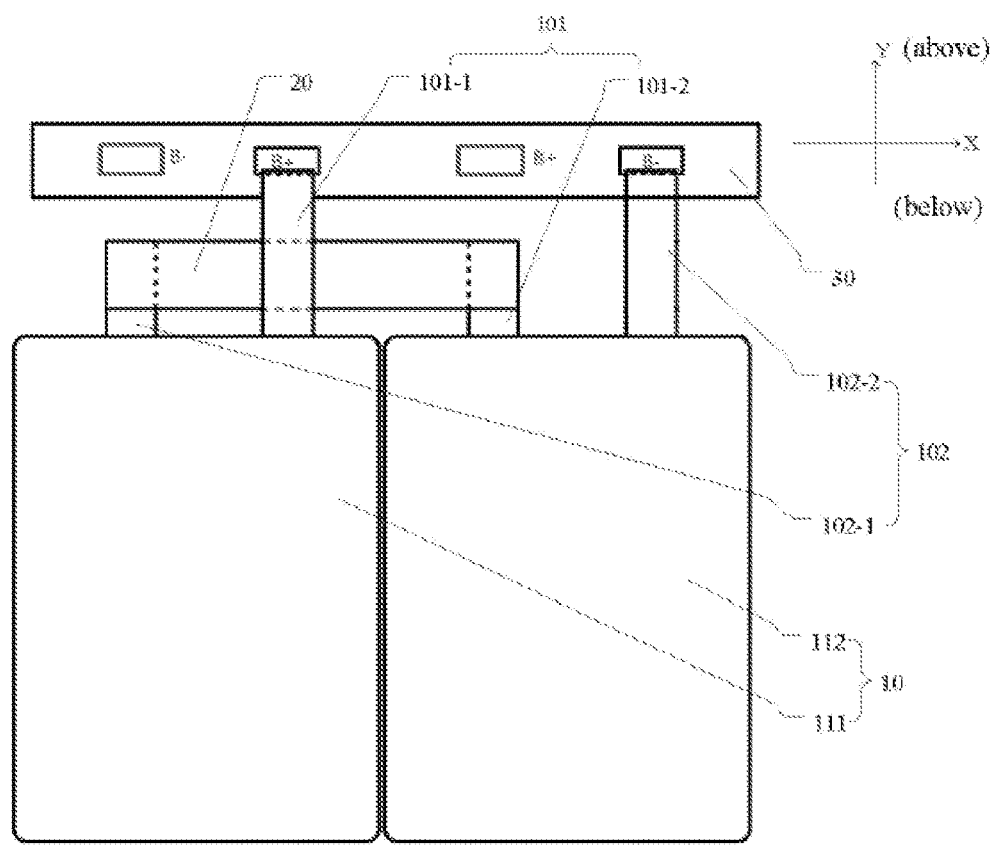
FIG. 2 is a schematic diagram showing a battery module according to some embodiments.
Figure 3:
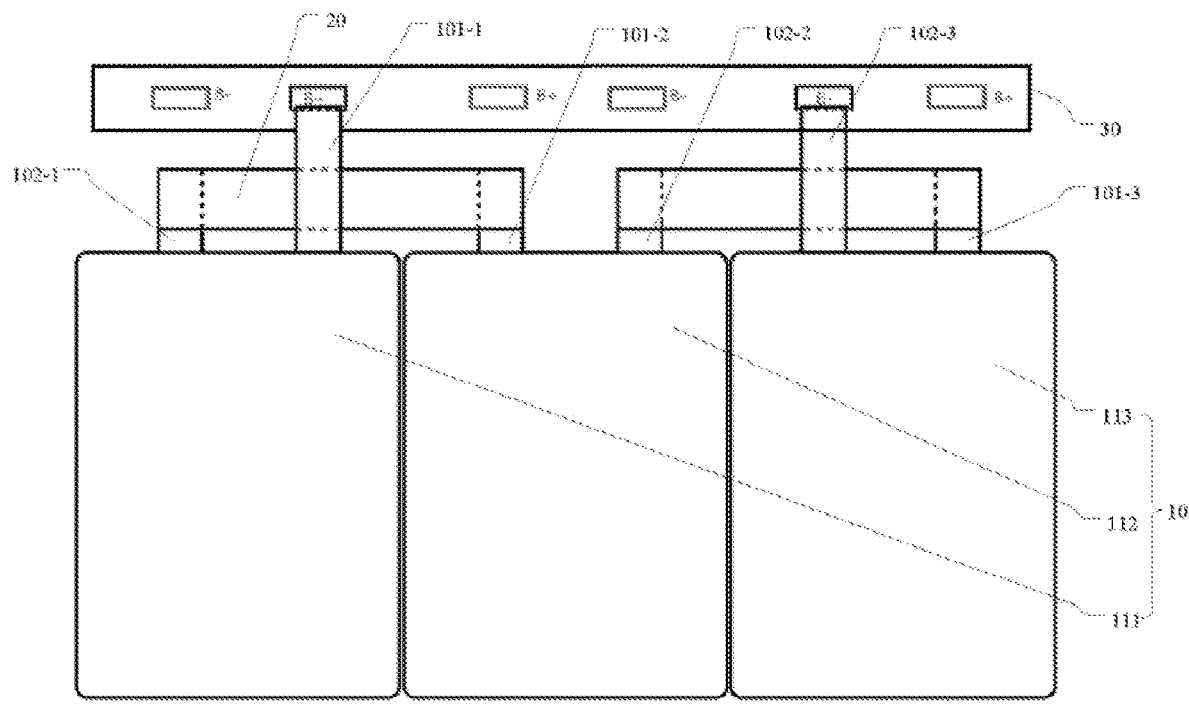
FIG. 3 is a schematic diagram showing a battery module according to some embodiments.

As can be seen in combination with FIG. 2 or FIG. 3, in this embodiment, the battery cells 11 located at the two ends of the battery cell component 10 are connected to the protection circuit board 30 through their corresponding tabs. For example, the battery cell 11 located at one end of the battery cell component 10 is connected to the protection circuit board 30 through its positive or negative tab, and the battery cell 11 located at the other end of the battery cell component 10 is connected to the protection circuit board through its negative or positive tab. The remaining tabs of the battery cell 11 do not need to be connected to the protection circuit board 30, which effectively saves the space on the protection circuit board 30.

In this embodiment, since the connection manner of the battery cell 11 effectively saves the space of the protection circuit board 30, the size of the protection circuit board 30 can also be appropriately reduced. At this time, the preset direction can be set as the width direction (X direction) of the terminal device, that is, the battery cells 11 are arranged side by side along the width direction. Correspondingly, the protection circuit board 30 extends in the width direction, which effectively shortens the length compared with the related art, thereby reserving more space for the battery cell component 10.

In some embodiments, still referring to FIG. 2 or FIG. 3, each battery cell 11 includes a positive tab 101 and a negative tab 102. In the preset direction, the battery cells 11 in the battery cell component 10 can be arranged from high potential to low potential. For example, the positive tab 101 of the battery cell 11 of the high potential and the negative tab 102 of the battery cell 11 of the low potential are connected to the protection circuit board 30.

In this embodiment, the positive tab 101 of the battery cell 11 (high potential) at one end of the battery cell component 10 is electrically connected to the protection circuit board 30, and the negative tab 102 of the battery cell 11 (low potential) at the other end of the battery cell component 10 is electrically connected to the protection circuit board 30. The negative tab 102 of adjacent one battery cell 11 is electrically connected to the positive tab 101 of adjacent another battery cell 11 through the conductive element 20. In the embodiment, the length of the negative tab 102 or the positive tab 101 of the battery cell 11 can be cut and adjusted as required. For details, please refer to the following examples.

In an example, as shown in FIG. 2, the battery cell component 10 includes two battery cells 11 arranged along the width direction of the terminal device, namely a first battery cell 111 and a second battery cell 112, wherein the first battery cell 11 is a high-potential battery cell. One conductive element 20 is included in this example.

The positive tab 101-1 of the first battery cell 111 is connected to the positive port (B+) of the protection circuit board 30, and the negative tab 102-2 of the second battery cell 112 is connected to the negative port (B−) of the protection circuit board 30. The negative tab 102-1 of the first battery cell 111 and the positive tab 101-2 of the second battery cell 112 are connected through the conductive element 20.

Compared with the related art, in this example, there are only two tabs connected to the protection circuit board 30, so only two welding nickel plates need to be provided on the protection circuit board 30, which effectively reduces the number of welding nickel plates. Therefore, the space of the protection circuit board 30 is saved, and it is convenient to arrange other electrical components on the protection circuit board 30. In addition, the battery cells 11 are arranged along the width direction of the terminal device, and the length of the protection circuit board 30 is also effectively shortened compared with the related art, which can reserve sufficient space for the battery cell component 10, which is beneficial to increase the size of the battery cells and improve the battery capacity.

In another example, as shown in FIG. 3, the battery cell component 10 includes three battery cells 11 arranged along the width direction of the terminal device, namely a first battery cell 111, a second battery cell 112, and a third battery cell 113, wherein the first battery cell 111 is a high-potential battery cell, the third battery cell 113 is a low-potential battery cell, and the potential of the second battery cell 112 is located between them two. Two conductive elements 20 are included in this example.

The positive tab 101-1 of the first battery cell 111 is connected to the positive port (B+) of the protection circuit board 30, and the negative tab 102-3 of the third battery cell is connected to the negative port (B−) of the protection circuit board 30. The negative tab 102-1 of the first battery cell 111 and the positive tab 101-2 of the second battery cell 112 are connected through a conductive element 20, and the negative tab 102-2 of the second battery cell 112 and the positive tab 101-3 of the third battery cell 113 are connected through another conductive element 20.

In the manner of three battery cells in this example, there are also only two tabs connected to the protection circuit board 30, which effectively saves the space of the protection circuit board 30, and it is convenient to arrange other electrical components on the protection circuit board 30. In addition, the battery cells 11 are arranged along the width direction of the terminal device, and the length of the protection circuit board 30 is also effectively shortened compared with the related art, which can reserve sufficient space for the battery cell component 10.

In other examples, when the number of battery cells 11 is greater than three, the connection manner of the present disclosure can ensure that only the tabs at two ends of the battery cell component 10 are connected to the protection circuit board 30, and the tabs of the battery cell 11 in the middle achieves the electrical connection through the conductive element 20. Only the area occupied by two welding nickel plates is remained on the protection circuit board 30, which saves the space of the protection circuit board 30 to the utmost extent.

Figure 4:
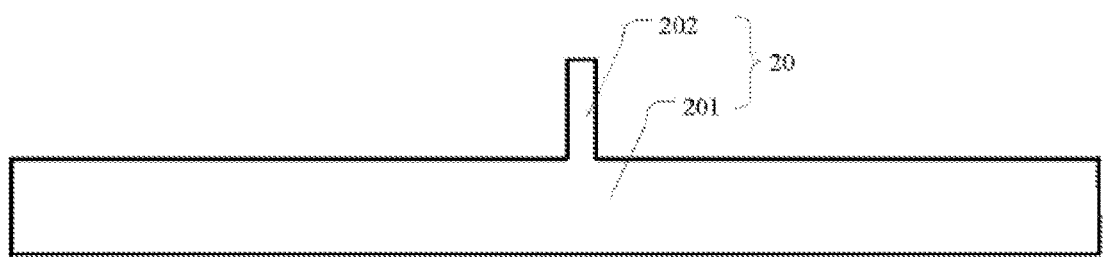
FIG. 4 is a schematic diagram showing a conductive element according to some embodiments.

In some embodiments, as shown in FIG. 4, the conductive element 20 may be, for example, a conductive sheet. When the conductive element 20 is used to realize the connection of the tabs of the adjacent battery cells 11, the conductive element 20 is coated outside the positive tab 101 and/or the negative tab 102. It can be seen from FIG. 6 or FIG. 7 that the first part of the conductive element 20 is located on the first surface side of the battery cell 11, and the second part of the conductive element 20 is located on the second surface side of the battery cell 11. In the embodiment, the second surface may be, for example, a shallow pit surface of the battery cell 11 (the back surface of the battery cell in the current state shown in the figure). There is an interval between the plane where the shallow pit surface is located and the tab.

In this embodiment, after the conductive element 20 dads the positive tab 101 and the negative tab 102 on the first surface side of the battery cell 11, the conductive element 20 can be folded to the second surface side of the battery cell 11. It uses the distance between the tab and the surface of the battery cell 11 to accommodate the conductive element 20, which effectively reduces the space occupied by the conductive element 20 on the basis of reasonably using the space. In addition, folding the conductive element 20 to the shallow pit surface of the battery cell can disperse the heat of the battery cell and reduce the temperature rise of the protection circuit board 30 and the battery module.

In some embodiments, an insulating layer is provided outside the conductive element 20. After the conductive element 20 is coated on the tabs of the battery cell 11, the insulating work of the conductive element 20 needs to be done, and an insulating layer is coated outside the conductive element 20.

In this embodiment, for example, insulating double-sided tape or foam with glue can be used outside the conductive element 20, to stick and reinforce the conductive element 20. It not only meets the insulation requirements of the outer side of the conductive element 20, but also ensures the reliability of the battery module during the drop process of the battery module or the terminal device.

In some embodiments, as shown in FIG. 4, the conductive element 20 includes: a connecting part 201 and a detecting part 202. One end of the detecting part 202 is connected to the connecting part 201, and the other end of the detecting part 202 is electrically connected to the protection circuit board 30. The connecting part 201 is connected to the battery cell 11.

Figure 6:
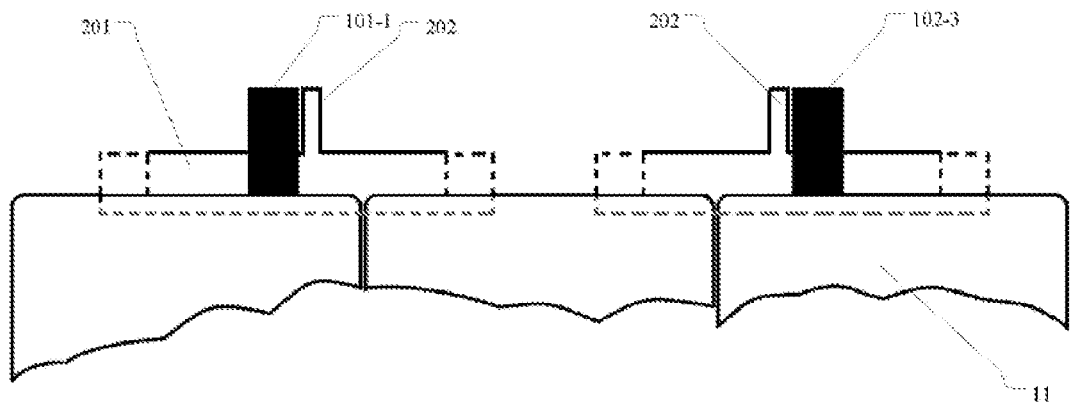
FIG. 6 is a schematic diagram showing the assembly of the battery module during the packaging process according to some embodiments.
Figure 7:
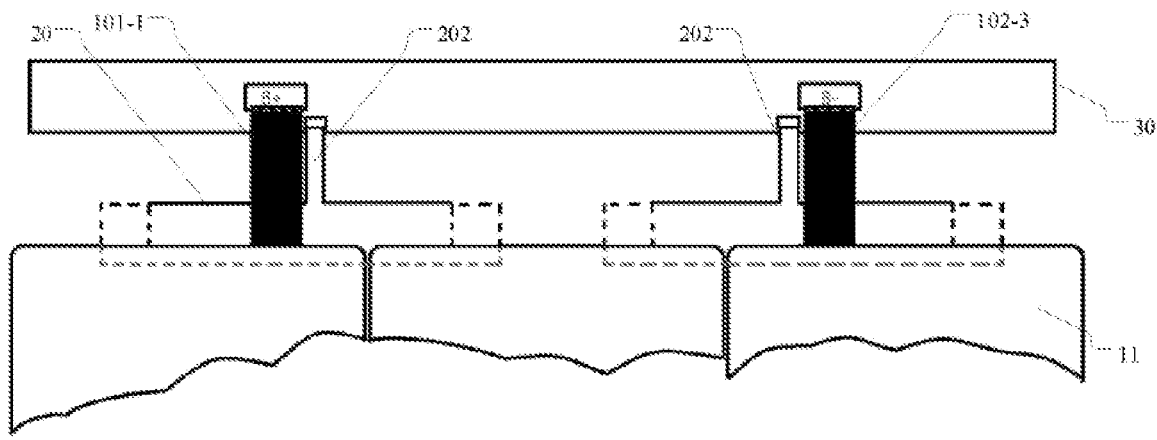
FIG. 7 is a schematic diagram showing the assembly of the battery module during the packaging process according to some embodiments.

In this embodiment, with reference to FIGS. 6 to 7, the connecting part 201 may be connected to the tab of the battery cell 11 (for example, by welding). After the conductive element 20 is turned over from the first surface of the battery cell 11 to the second surface side of the battery cell 11, the connecting part 201 may be in contact with or connected to the second surface of the battery cell 11.

In some embodiments, still referring to FIG. 4, the connecting part 201 extends in a predetermined direction, and two ends of the connecting part 201 are used to connect to the tabs of the battery cell 11. In this embodiment, the detecting part 202 is located at a preset position of the connecting part 201. The preset position may be, for example, a structural center of the connecting part 201, i.e., a middle position of the connecting part in its extending direction.

In the embodiment, welding positions can be reserved at two ends of the connecting part 201, and the tabs of the battery cell 11 are welded to the welding positions of the connecting part 201. For example, in conjunction with FIG. 2, in an example in which the battery cell component 10 includes two battery cells 11, one end of the connecting part 201 is welded to the negative tab 102-1 of the first battery cell 111, and the other end of the connecting part 201 is welded to the positive tab 101-2 of the second battery cell 112.

The detecting part 202 is connected to the protection circuit board 30 to detect the voltage of the battery cell 11. For example, with reference to FIG. 2, in an example in which the battery cell component 10 includes two battery cells 11, the voltage of the first battery cell 111 is detected by connecting the detecting part 202 to the negative tab 102-1 of the first battery cell 111. The voltage of the second battery cell 112 is detected by connecting the detecting part 202 to the positive tab 101-2 of the second battery cell 112.

In this embodiment, the conductive element 20 may adopt a conductor made of copper plating nickel, which is punched and molded at one time. The impedance of the conductive element 20 is effectively reduced.

Figure 8:
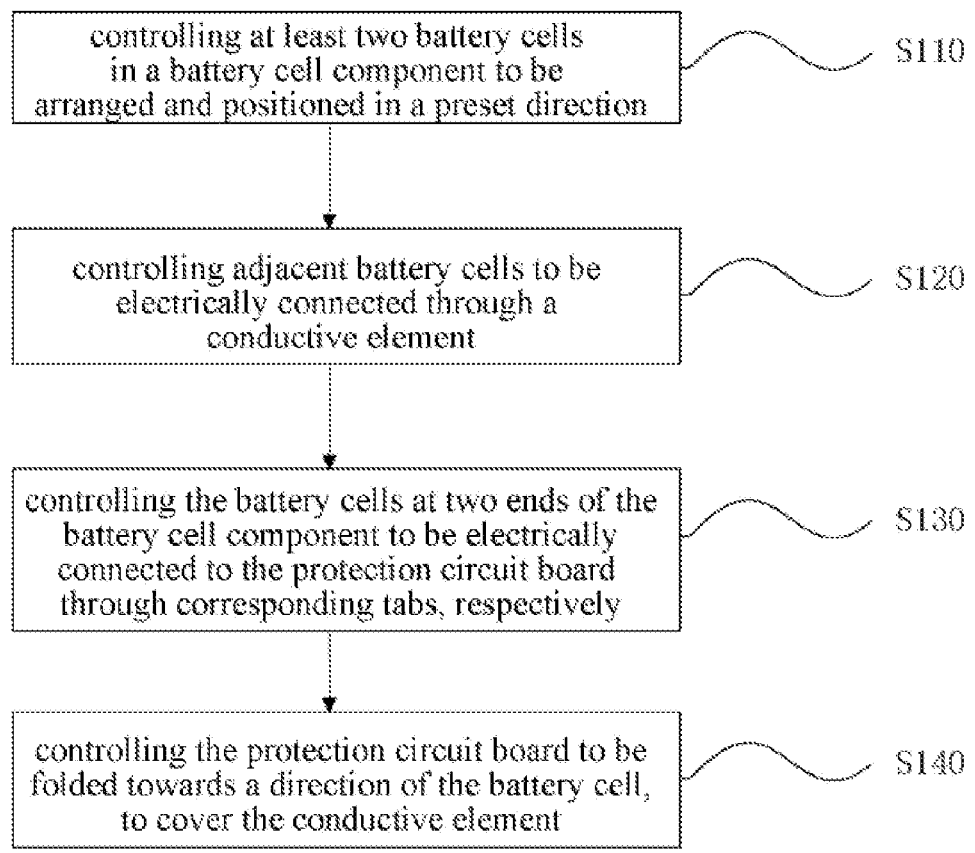
FIG. 8 is a flow chart showing a method according to some embodiments.

In some embodiments, the present disclosure also proposes a packaging method of a battery module, which is applied to the battery module related to the above-mentioned embodiments. As shown in FIG. 8, the packaging method includes following steps:

S110, controlling at least two battery cells in a battery cell component to be arranged and positioned in a preset direction;

S120, controlling adjacent battery cells to be electrically connected through a conductive element;

S130, controlling the battery cells at two ends of the battery cell component to be electrically connected to the protection circuit board through corresponding tabs, respectively.

In step S110, the preset direction may be, for example, the length direction or the width direction of the terminal device. In this embodiment, the preset direction is the width direction of the terminal device. Referring to FIGS. 2-7, at least two battery cells 11 are arranged side by side in the width direction. The tabs of each battery cell 11 are located on the same side.

In step S120, the tabs of adjacent battery cells may be connected by conductive elements. For example, the positive tab or the negative tab of a battery cell is connected to the negative tab or the positive tab of an adjacent battery cell. For example, as shown in FIG. 2, in an example in which the battery cell component 10 includes two battery cells 11, the negative tab 102-1 of the first battery cell 111 is connected to one end of the conductive element 20, and the other end of the conductive element 20 is connected to the positive tab 101-2 of the second battery cell 112.

Figure 9:
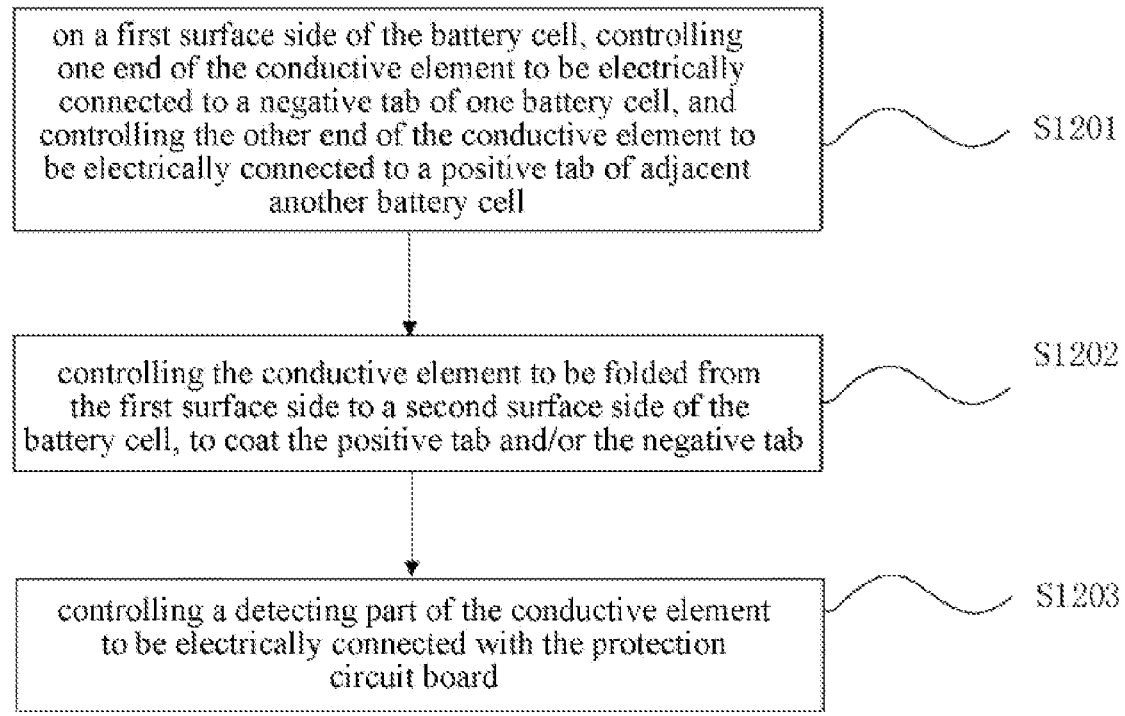
FIG. 9 is a flow chart showing a method according to some embodiments.

As shown in FIG. 9, the step S120 in this embodiment specifically includes following steps.

S1201, on a first surface side of the battery cell, one end of the conductive element is controlled to be electrically connected to a negative tab of one battery cell, and the other end of the conductive element is controlled to be electrically connected to a positive tab of adjacent another battery cell.

Figure 5:
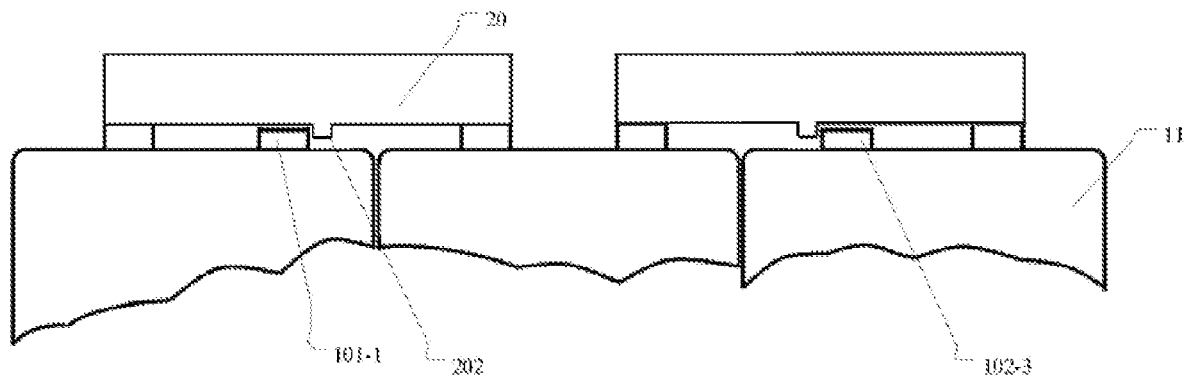
FIG. 5 is a schematic diagram showing the assembly of the battery module during the packaging process according to some embodiments.

In the embodiment, as shown in FIGS. 5 to 7, during the connection process, the size of the tab can be adjusted adaptively. For example, the positive tab 101 with a longer length is reserved for connection with the protection circuit board 30. The tab (not marked in the figure and covered by the conductive element 20) is cut to an appropriate length to be connected to the conductive element 20.

The connection manner may be, for example, using a jig to fix the conductive element 20 and the tabs of the battery cell 11, and using laser welding to weld the tabs and the conductive element 20 together. In this welding process, as shown in FIG. 5, the tabs (the positive tab 101-1 and negative tab 102-3 marked in the figure) connected to the protection circuit board 30 and the detecting part 202 of the conductive element 20 should be lifted to make way.

S1202, the conductive element is controlled to be folded from the first surface side to a second surface side of the battery cell, to coat the positive tab and/or the negative tab.

In the embodiment, referring to FIGS. 5 to 7, during the folding process, the tabs (the positive tab 101-1 and negative tab 102-3 marked in the figure) connected to the protection circuit board 30 and the detecting part 202 of the conductive element 20 should also be lifted to make way.

After the folding, the conductive element 20 should be insulated and fixed. For example, double-sided tape and foam glue can be used to fix the conductive sheet, to meet the insulation requirements while ensuring the reliability of the battery or a terminal device when it is dropped.

S1203, a detecting part of the conductive element is controlled to be electrically connected with the protection circuit board.

In the embodiment, referring to FIG. 7, the detecting part 202 of the conductive element 20 is connected to a preset interface of the protection circuit board 30, to realize the voltage detection of the battery cell.

In step S130, only the corresponding tabs of the battery cells located at two ends of the battery cell component are connected to the protection circuit board 30.

For example, as shown in FIG. 3, the battery cell 111 located at one end of the battery cell component 10 is connected to the protection circuit board 30 through its positive tab 101-1, and the battery cell 113 located at the other end of the battery cell component 10 is connected to the protection circuit board through its negative tab 102-3. The remaining tabs of the battery cell 11 do not need to be connected to the protection circuit board 30, which effectively saves the space on the protection circuit board 30.

In the above steps, in the process of connecting each component, the battery cell 11, the conductive element 20 and the protection circuit board 30 can be fixed and positioned using a jig, and then a laser welding manner may be adopted to connect the tabs of the battery cell 11 and the protection circuit board 30, the tabs and the conductive element 20, and the detecting part 202 of the conductive element 20 and the protection circuit board 30.

In some embodiments, still referring to FIG. 8, the method of this embodiment further includes:

S140, controlling the protection circuit board to be folded towards a direction of the battery cell, to cover the conductive element.

In the embodiment, the protection circuit board 30 is folded to cover the conductive element 20, and then all the components are fixed with adhesive paper, to complete the packaging of the battery module.

In some embodiments, the present disclosure proposes a terminal device, including the battery module involved in the foregoing embodiments.

Various embodiments of the present disclosure can include one or more of the following advantages.

Adjacent battery cells are electrically connected through conductive elements; the battery cells located at two ends of the battery cell component are connected with the protection circuit board through the tabs. It is not necessary for tabs of all battery cells to be connected to the protection circuit board, which effectively reduces space of the protection circuit board occupied due to the connection of the tabs, thereby increasing space on the protection circuit board for arranging other electrical components.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A battery module, comprising:
   a battery cell component, comprising at least two battery cells arranged in a preset direction;
   a conductive element, wherein adjacent battery cells are electrically connected through the conductive element; and
   a protection circuit board, wherein battery cells located at two ends of the battery cell component are electrically connected to the protection circuit board through corresponding tabs, respectively,
   wherein the conductive element comprises: a connecting part and a detecting part, and wherein one end of the detecting part is directly connected to a middle of the connecting part, and another end of the detecting part is directly electrically connected to the protection circuit board; and the connecting part is connected to the battery cell, wherein the conductive element is in a "T" shaped structure,
   wherein each of the battery cells comprises a positive tab and a negative tab;
   a positive tab of the battery cell at one end of the battery cell component is electrically connected to the protection circuit board, and a negative tab of the battery cell at the other end of the battery cell component is electrically connected to the protection circuit board; and
   a negative tab of adjacent one battery cell is electrically connected to a positive tab of adjacent another battery cell through the conductive element,
   wherein the conductive element is coated outside the positive tab and/or the negative tab; and a first part of the conductive element is located on a first surface side of the battery cell, and a second part of the conductive element is located on a second surface side of the battery cell, and an interval exists between a plane where the second surface side is located and the tab.

2. The battery module according to claim 1, wherein an insulating layer is provided outside of the conductive element.

3. The battery module according to claim 2, wherein the insulating layer comprises insulating glue and/or foam.

4. The battery module according to claim 1, wherein the connecting part extends along the preset direction, and two ends of the connecting part are used to connect to tabs of the battery cell; and the detecting part is located at a preset position of the connecting part.

5. The battery module according to claim 1, wherein the conductive element comprises a conductor made of copper plating nickel.

6. A packaging method of the battery module according to claim 1, wherein the packaging method comprises:
controlling at least two battery cells in a battery cell component to be arranged and positioned in a preset direction;
controlling adjacent battery cells to be electrically connected through a conductive element; and
controlling the battery cells at two ends of the battery cell component to be electrically connected to the protection circuit board through corresponding tabs, respectively.

7. The packaging method of the battery module according to claim 6, wherein the controlling adjacent cells to be electrically connected through a conductive element comprises:
on a first surface side of the battery cell, controlling one end of the conductive element to be electrically connected to a negative tab of one battery cell, and controlling the other end of the conductive element to be electrically connected to a positive tab of adjacent another battery cell;
controlling the conductive element to be folded from the first surface side to a second surface side of the battery cell, to coat the positive tab and/or the negative tab;
controlling a detecting part of the conductive element to be electrically connected with the protection circuit board.

8. The packaging method of the battery module according to claim 6, further comprising:
controlling the protection circuit board to be folded towards a direction of the battery cell, to cover the conductive element.

9. A terminal device comprising a battery module, wherein the battery module comprises:
a battery cell component including at least two battery cells arranged in a preset direction;
a conductive element, wherein adjacent battery cells are electrically connected through the conductive element; and
a protection circuit board, wherein battery cells located at two ends of the battery cell component are electrically connected to the protection circuit board through corresponding tabs, respectively,
wherein the conductive element comprises: a connecting part and a detecting part, and wherein one end of the detecting part is directly connected to a middle of the connecting part, and another end of the detecting part is directly electrically connected to the protection circuit board; and the connecting part is connected to the battery cell, wherein the conductive element is in a "T" shaped structure,
wherein each of the battery cells comprises a positive tab and a negative tab;
a positive tab of the battery cell at one end of the battery cell component is electrically connected to the protection circuit board, and a negative tab of the battery cell at the other end of the battery cell component is electrically connected to the protection circuit board; and
a negative tab of adjacent one battery cell is electrically connected to a positive tab of adjacent another battery cell through the conductive element,
wherein the conductive element is coated outside the positive tab and/or the negative tab; and a first part of the conductive element is located on a first surface side of the battery cell, and a second part of the conductive element is located on a second surface side of the battery cell, and an interval exists between a plane where the second surface side is located and the tab.

10. The terminal device of claim 9, wherein not all of the at least two battery cells are connected to the protection circuit board, thereby reducing space of the protection circuit board occupied resulting from connections of the tabs, thereby increasing space on the protection circuit board for arranging other electrical components.

11. The terminal device of claim 9, wherein an insulating layer is provided outside of the conductive element.

12. The terminal device of claim 11, wherein the insulating layer comprises insulating glue and/or foam.

13. The terminal device of claim 9, wherein the connecting part extends along the preset direction, and two ends of the connecting part are used to connect to tabs of the battery cell; and the detecting part is located at a preset position of the connecting part.

14. The terminal device of claim 9, wherein the conductive element comprises a conductor made of copper plating nickel.

* * * * *